Feb. 16, 1965 F. G. STEELE 3,170,148

MAGNETIC DRUM MEMORY SYSTEM

Original Filed Feb. 16, 1956

INVENTOR:
Floyd G. Steele
By Seymour Scholnick
Attorneys 3,170,148

MAGNETIC DRUM MEMORY SYSTEM

Floyd G. Steele, La Jolla, Calif., assignor to Digital Controls Systems, Inc., La Jolla, Calif.

Original application Feb. 16, 1956, Ser. No. 566,219, now Patent No. 2,995,729, dated Aug. 8, 1961. Divided and this application Aug. 20, 1959, Ser. No. 835,095
7 Claims. (Cl. 340—174.1)

This invention relates to magnetic drum memories having associated therewith magnetic transducers which are movable parallel to the drum axis in fixed synchronism with the drum rotation and, more particularly, to a memory drum having a pair of magnetic transducers driven by a level wind shaft for alternately traversing two spiral tracks on the surface of the drum.

This is a divisional application from the patent application of Floyd G. Steele, for an "Electronic Digital Inventory Computer," Serial No. 566,219, filed February 16, 1956, now Patent No. 2,995,729.

There are many large-memory computing systems, for example, inventory computers, which are most commonly used in department stores or mail order houses for maintaining a running inventory on the various merchandise items in stock or back-ordered. Similar computers are also used by public carriers for tallying passenger reservations and for indicating the number of passenger accommodations still available on particular trains or aircraft flights.

A serial storage device such as magnetic tape or a drum has long been recognized as the least expensive method of achieving a large volume memory. A single data input and output station can examine every entry in the time required to circulate the entire memory. The access time to an individual data item is therefore determined by the size of the memory, and in the case of very large memories, the access time may be appreciable. If only one entry can be processed during each recirculation of the memory, then some of the advantages of the serial form may be lost through the imposed delays.

In at least one prior art inventory computer, the problem of inefficient use of time has been partially solved by dividing the principal inventory memory, containing the item quantities, into a large number of parallel tracks on the memory drum. Accordingly, when an inventory change entry is received, it is only necessary to scan the part of the principal memory in one of the parallel tracks to obtain the old inventory item quantity and to change it.

Although this scheme represents an improvement, the average rate of entry is still limited to one entry for every one and one-half drum revolutions. Of considerable more significance, however, is the fact that the utilization of parallel tracks for the principal memory greatly increases the size and complexity of the computer and concomitantly decreases its reliability. Further, to operate such a memory, not only must a read and write head be provided for each of the tracks, but a complex track selection network for switching from track to track is also needed. Alternatively, an elaborate mechanism can be used to move a single head to a selected track if extremely accurate indexing devices are provided to align the head with the selected track.

In the parent application, there was provided a wholly new concept in inventory computers which contributes to high volumetric efficiency, relatively few components and an exceptionally high input entry rate. The inventory computer therein disclosed employs an intermediate recirculating memory, synchronized with a serial principal inventory memory utilizing a moving head drum, and is operative as an input buffer for receiving a plurality of inventory change orders during each recirculation of the intermediate memory, the change orders received bein stored in the intermediate memory until they can be em ployed subsequently for modifying the corresponding in ventory item quantities when they are presented by th principal memory.

The principal memory of the computer is a long acces circulating memory in which an entire inventory can b stored. In the preferred embodiment of the compute a magnetic drum is used for both the principal and inte mediate memories as well as for additional buffer storag and counters, control channels and the like. The prin cipal memory is mechanized by providing a moving trans ducer assembly which traces a helical channel along th drum in an axial direction, enabling several rotations o the circular channels to each circulation of the principa memory.

In the preferred computer of the parent applicatior the principal memory is divided into 100 informatio blocks, each of which includes 100 inventory iten sectors. Each sector is further subdivided into 24 stor age spots or cells in which a single bit can be recorded As the drum rotates, the contents of the principal memor are serially presented block by block and sector by secto within each block. A recirculation of the memory there fore requires several revolutions of the drum.

To greatly increase the efficiency of the principal mem ory, in the preferred embodiment, the drum is divide into two domains, each with its own set of reading an writing transducers. The reading transducers for eac sector are connected to followers that are driven by helically counterwound level wind shaft which has tw domains or, in other words, a shaft having two endles worms positioned thereon, each worm corresponding t a domain of the drum. The write transducers are simi larly connected to followers driven by a second leve wind shaft, identical in all respects to the first. The leve wind shafts are driven in synchronism with the drum and as a result each transducer traces out a forwar and a return helical channel on the drum. The rea transducers are positioned to be in the channel recorde by its associated write transducer in the correspondin domain and may, for convenience, be displaced by a tur of the helix. During operation, the transducers mov in a reciprocating fashion first traversing the drum i one direction and then reversing direction. The trans ducers are arranged so that when the transducers of on domain are moving in their forward or operative direc tion, the transducers of the other domain are moving i their return or inoperative direction, and vice versa. Ex cept for the instances of direction change, a set of trans ducers is considered operative at all times. Time nee not be lost waiting for moving heads to return to th start position without the disadvantage of writing ove the information recorded during the forward traverse.

It is therefore an object of the invention to provide relatively long serial memory on a magnetic drum b moving a magnetic transducer parallel to the axis of th drum in synchronism with rotation of the drum to recor a spiral track thereon.

Another object of the invention is to provide a rela tively long recirculating memory on a magnetic track b reciprocatingly moving a pair of magnetic transducer parallel to the axis of the drum in synchronism with th rotation thereof to provide a pair of spiral tracks on th drum, the transducers being alternately operative.

It is a still further object of invention to provide memory drum having a first moving transducer that i operable while traversing the drum in a forward directio and a second transducer that is operable while the firs transducer is retraversing the drum in a return directio so that no time is wasted in returning a transducer to the start position.

It is an additional object of the invention to provide a relatively long serial memory on a drum by reciprocatingly moving transducers in an axial direction and for operating the memory while a transducer is on a return traverse without disturbing information recorded during a prior forward traverse of the same transducer.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
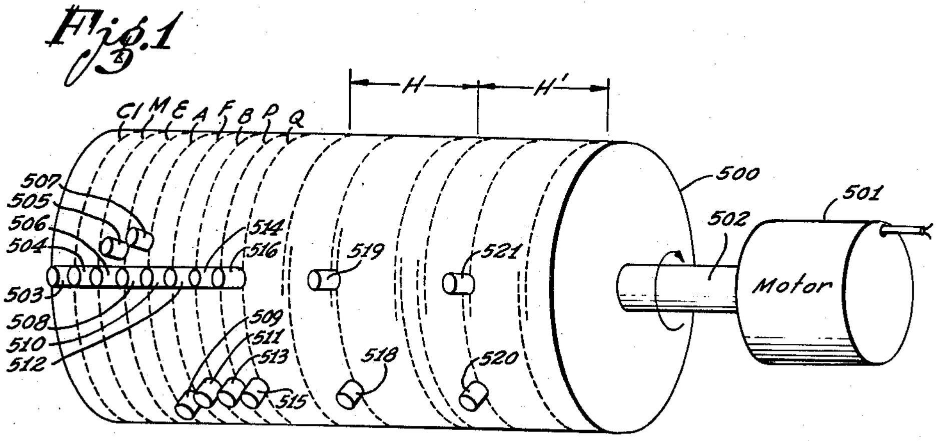
FIGURE 1 is a three dimensional view of a magnetic drum memory which may be utilized in computers constructed in accordance with the invention, and illustrates the magnetic track arrangement for a specific embodiment of the invention.

With reference now to the drawings, like or corresponding parts have been designated by the same reference characters throughout the several views and are the same reference characters that were applied to the corresponding parts of the parent application. There is shown in FIGURE 1, one form of magnetic drum storage unit which may be utilized in the inventory computer of the invention of the parent application and in which the read-write structure of the principal inventory memory is simplified through the utilization of a helically recorded long channel. Basically the storage unit includes a magnetic drum 500 which is rotatably driven by a shaft 502 from an electric motor, 501 and a plurality of magnetic transducers or heads which are positioned adjacent the periphery of the drum by associated transducer mounting apparatus, not shown.

As shown in FIGURE 1, drum 500 has a plurality of circumferentially disposed closed-loop record channels designated C1 through Q on its surface, the functions of these tracks, together with the designated of their associated reading and writing heads are correlated by the following table and are fully described in the parent application:

*Table 1*

| Channel | Read Head | Write Head | Function |
|---|---|---|---|
| C1 | 503 | None | Clock channel for generating timing pulses which operate computer. |
| M | 504 | None | Timing mark channel for dividing each item section into quadrants. |
| E | 505 | 506 | Short precessing channel employed with address channel A. |
| A | 507 | 508 | Address channel which functions with channel E as address counter. |
| F | 509 | 510 | Long precessing channel used for excess-three code fix-up item quantities. |
| B | 511 | 512 | Storage channel for holding order identification number from keyboard. |
| P | 513 | 514 | Intermediate Channel. |
| Q | 515 | 516 | Auxiliary Channel of Principal Memory. |

The clock channel, C1 which is one complete channel of the drum, contains 3,000 stored marks, each of which identifies a storage spot in each of the other channels therefore, there are a maximum of 3,000 spots which can be stored in any circumferential channel of the drum.

The long channel of the principal memory is recorded on drum 500 as a pair of adjacent helically counterwound tracks, one of which will hereinafter be designated the H domain while the other will be designated the H' domain, as illustrated in the drawing. Each of these helical tracks includes an associated write head and read head, the write heads for domains H and H' being designated 518 and 520, respectively while the read heads are designated 519, and 521, respectively. In operation, both sets of read and write heads are simultaneously moved in the same direction longitudinally across their respective domains in a reciprocatitng movement and in synchronism with the drum rotation, the H domain read and write heads 519, 518 being operative when all of the heads are moving to the left, as viewed in FIGURE 1, while the H' domain read and write heads 521, 520 are operative when all of the heads are moving to the right.

Figure 2:
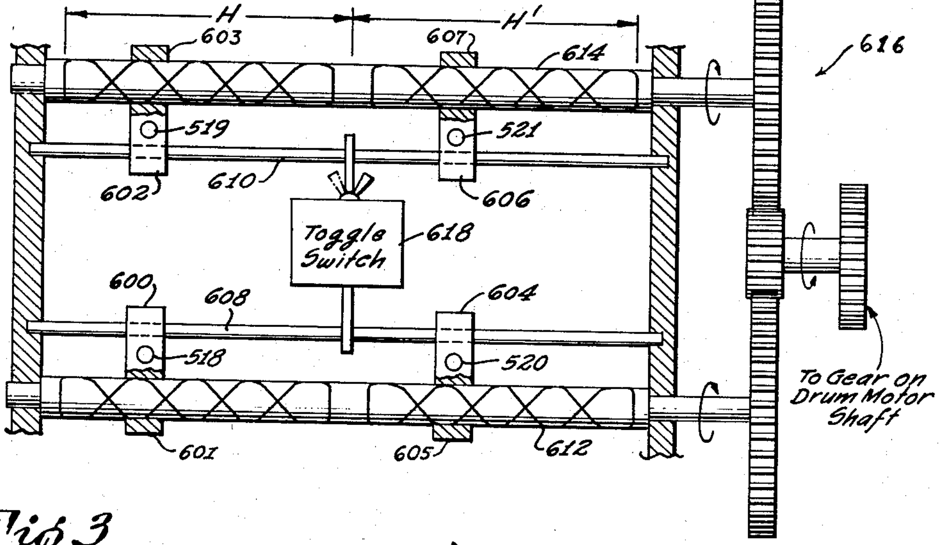
FIGURE 2 is a developed view of a magnetic transducer moving device which is utilized with the drum of FIGURE 1 to provide a principal inventory memory in the form of two spiral tracks on the drum.

Referring now to FIGURE 2, there is shown a developed view of one form of head moving mechanism which imparts the desired reciprocating motion to the heads in synchronism with rotation of the memory drum. The mechanism includes four head mounts 600, 602, 604, and 606 for mounting heads 518, 519, 520 and 521, respectively. The head mounts are longitudinally slidable on a pair of guide rods 608 and 610 and are driven by a pair of duplex level-wind shafts 612 and 614, each shaft having a pair of endless worms thereon. Each of the write head mounts 600, 604 is connected to the first or write level wind shaft 612 by a follower portion 601, 605, which propels the respective head mount longitudinally along the write guide rod 608 as the wind shaft 612 rotates. Similarly the read head mounts 602, 606 are connected to the second or read level wind shaft 614 by follower portion 603, 607 which propel the head mounts along the read guide rod 610. The level wind shafts are in turn driven in synchronism with the memory drum through a suitable reduction gear unit generally designated 616. The gearing is arranged so that an integral number of drum revolutions is required for complete reciprocation cycle.

Each of the level wind shafts of the disclosed embodiment has two separate, level wind tracks so that, in operation, the head mounts move together in the same direction longitudinally across the drum surface by rotation of the level-wind shafts 612, 614 driving the followers. The read head mounts 602 and 606 actuate a toggle switch 618 each time one or the other is moved to the center of the head moving mechanism, as viewed in FIGURE 2.

Figure 3:
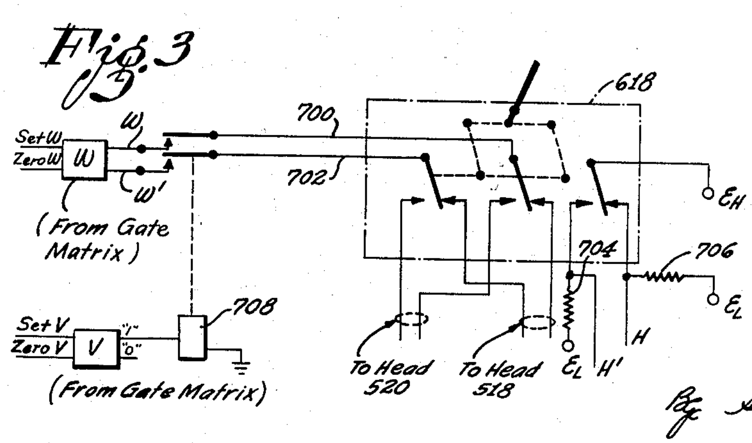
FIGURE 3 is a schematic view of a magnetic transducer switching circuit for switching alternately between the two spiral tracks on the drum of FIGURE 1 in response to movement of the magnetic transducers by the device of FIGURE 2.

As shown in FIGURE 3, which illustrates schematically one form of toggle switch which may be employed in the head moving mechanism, actuation of the toggle switch 618 functions to switch a pair of write conductors 700 and 702 between write heads 518 and 520. The write conductors 700, 702 are connected to the output terminals of a write flip-flop, W, which receives input signals from a gating matrix such as shown and described in the parent application. In addition, the toggle switch 618 functions to switch a relatively high level voltage $E_H$, (supplied by a source of potential, only one terminal of which is shown) between a pair of output conductors H and H', which are normally maintained at a relatively low voltage $E_L$ by a pair of resistors 704 and 706. Signals $E_L$ and $E_H$ on conductors H and H', serve to indicate to the computer control network (not shown here) whether the write heads are operating in the H domain or in the H' domain. The computer control circuitry is fully set forth in the parent application and a discussion herein is not deemed necessary to an understanding of the present invention.

It should be pointed out that only write heads 518 and 520 are switched in accordance with head movement, and that read heads 519 and 521 are continuously functioning as they move in both directions. It is obvious that signals $E_L$ and $E_H$ on conductors H and H' could easily be applied to a gating circuit to selectively transmit signals from only one of them. However, the computer of the parent application accepts signals from only one read head at a time, depending upon which of the toggle switch output conductors H and H′ is presenting a relatively high level voltage. The write heads 518 and 519 are completely disconnected from the write flip-flop W during the preliminary routines of the computer, this function being accomplished by a pair of normally open contacts of a relay 708 which is actuated only when the computer commences its compute routine and a V flip-flop is in its "one" representing state. The inputs to the V flip-flop are connected to receive signals from the gating matrix of the parent application. The flip flop is placed in the "one" representing state during the operating routines, and in the "zero" representing state during the preliminary routines. This could be accomplished by a mechanical switch, as is well known in the art.

It has been assumed for the present example, that the principal memory is one hundred inventory blocks long, and that blocks 0 through 49 are sequentially recorded in the H′ domain while blocks 50 through 99 are sequentially recorded in the H domain. It is clear that the entire one hundred block principal memory may be sequentially scanned or interrogated in a continuous and cyclically repetitive manner. However, owing to the facts that the toggle switch may not always switch at precisely the same point, that the switching action may take as long as one sector interval during which the inventory information corresponding to an item could be lost, and that it is desirable to switch the computer simultaneously from one set of read and write heads to the other set, at least a portion of the principal inventory memory should be left blank at opposite ends of both the H and H′ domains to allow for switching.

The time of switching depends upon the sensitivity of the switch to motion of the head mounts, but toggle switches are available that operate consistently within a predetermined linear displacement. Analysis has shown that more than adequate protection is afforded if information blocks 0 and 49 in the H′ domain and blocks 50 and 99 in the H domain are left vacant, or in other words, if none of the inventory or catalog items are assigned addresses within these blocks. It will be appreciated, however, that the capacity of the principal memory is thereby decreased from ten thousand items to only ninety-six hundred items. It should also be pointed out that the same results could be achieved by employing a single level wind shaft or similar device for moving all of the reading and writing transducers, in which instance all of the transducers would be mechanically coupled by a common transducer mount.

In operation, as the drum 500 rotates, the level wind shafts 614, 612 reciprocate the associated read and write heads through the H and H′ domains. In a preferred embodiment the information in the H domain is processed while the H′ domain read and write heads 521, 520 are being returned to their start position. When the toggle switch 618 is actuated by the H domain head mount 602, the H′ domain heads 521, 520 are energized, and the H domain heads 519, 518 complete their travel and are returned to the start position.

It may be readily seen that no time is lost waiting for the moving heads to return after traversing the drum in one direction since one set of heads is operative at all times, depending upon the direction of head motions. Further, there is no danger of writing over information previously recorded when the transducers traverse in the return direction.

What is claimed as new is:

1. A magnetic memory comprising: a rotatable magnetic drum; first means for continuously rotating said drum; a rotatable level wind shaft having an endless worm thereon positioned adjacent said drum and having its axis substantially parallel with the longitudinal axis of said drum; a level wind shaft follower coupled to said lev wind shaft and engaging said endless worm to be opera tive in response to rotation of said level wind shaft fo moving reciprocatingly therealong in the dimension c the axis of said shaft; a magnetic writing transducer pos tioned contiguous with the surface of said drum an coupled to said level wind shaft follower for moving ther with; second means for applying to said transducer ele trical signals to be recorded; and third means intercou pling said level wind shaft with said first means to rota said level wind shaft in synchronization with the rotatio of said drum whereby said magnetic transducer is opera tive to record said electrical signals in a spiral magnet track on the surface of said drum.

2. The magnetic memory defined in claim 1 which fu ther includes a magnetic reading transducer contiguou with the surface of said drum; and means for couplin said reading transducer to said level wind shaft for mov ing said reading transducer in synchronism with said wri ing transducer and over the spiral track recorded thereby whereby signals recorded on the surface of said drun are read by said reading transducer.

3. A magnetic memory comprising: a rotatable mag netic memory drum having a longitudinal axis and a sub stantially smooth surface; at least one level wind sha positioned adjacent said drum and having its axis sub stantially parallel to the longitudinal axis of said drun said level wind shaft having an endless worm thereon; level wind shaft follower coupled to said shaft and en gaging said endless worm to be operable in response t rotation thereof for moving reciprocatingly therealong i the dimension of the axis of said shaft; a first selectivel operable magnetic writing transducer and a first magneti reading transducer, means for positioning said first tran ducers contiguous with the surface of said drum and fo moving said first transducers reciprocatingly over a fir predetermined length of said drum in synchronism wit the reciprocating movement of said level wind shaft fo lower; a second selectively operable magnetic writin transducer and a second magnetic reading transduce means for positioning said second transducers contiguou with the surface of said drum and for moving said secon transducers reciprocatingly over a second predetermine length of said drum in synchronism with the reciproca ing movement of said level wind shaft follower; driv means intercoupling said level wind shaft with said drun for continuously rotating said shaft and said drum i synchronism at a substantially constant rate; and switch ing means operating in response to movement of sai level wind shaft follower along said shaft for renderin operable said first writing transducer when said leve wind shaft follower is moving in one direction along sai shaft for rendering operable said second writing tran ducer when said level wind shaft follower is moving i the other direction along said shaft.

4. A magnetic memory recording apparatus compri ing: a rotatable magnetic drum having a longitudinal ax and a substantially smooth surface; means for continuou ly rotating said drum; a magnetic writing transducer po sitioned contiguous with the surface of said drum; an means for reciprocatingly moving said transducer bac and forth along the surface of said drum in a directio parallel to the longitudinal axis of said drum and in syn chronism with the rotation of said drum in both directior whereby said transducer is energizable to record a spir magnetic track on said drum when said drum is rotate a magnetic reading transducer positioned contiguous wit the surface of said drum, and means for mechanicall coupling said reading transducer to said writing tran ducer and for positioning said reading transducer ov the same track recorded by said writing transducer at fixed distance from said writing transducer whereby si nals presented by said reading transducer may be r recorded subsequently in the spiral track.

5. A cyclically operable memory for enabling the co tinuous transducing of information comprising: a rotatable drum having a smooth magnetizable surface; means for continuously rotating said drum; first and second writing transducers; said first and second transducers alternately and reciprocally traversing a first and a second helical channel, respectively, on the periphery of said drum, the cycle of operation of said transducer moving means corresponding to a predetermined integral number of rotations of said drum, and transducer moving means synchronously intercoupling said drum and said first and second transducers for cyclically moving said first and second transducers axially along said drum and in synchronism with rotation of said drum and with each other in both directions, whereby the same points on the periphery of the drum are retraversed in said first and second helical channels by said first and second transducers respectively at each cycle of operation of said transducer moving means, each point being traversed at a corresponding angular position of said drum.

6. The combination defined in claim 5 which includes identification apparatus for indicating when a predetermined point in one of said helical channels is being traversed by the corresponding transducer, said identification apparatus including a signal generator actuable for producing a predetermined identification signal, and actuating means intercoupling said drum and said signal generator and responsive to rotation of said drum for actuating said signal generator after each predetermined integral number of rotations, whereby each time that the identification signal is produced the same point on the same helical channel is being traversed by the same transducer.

7. A cyclically operable memory for enabling the continuous transducing of information comprising: a rotatable drum having a smooth magnetizable surface; first and second writing transducers; writing means operable for producing electrical information signals; a switch intercoupling said writing means and said first and second transducers and selectively settable to a first or second position for applying said information signals either to said first transducer or to said second transducer; transducer moving means intercoupling said drum and said transducers for cyclically and reciprocally moving said first and second transducers in synchronism with each other and with the drum to, respectively, alternately traverse a first and second helical channel on the periphery of said drum, said transducer moving means including apparatus for setting said switch to said first position after said second helical channel has been traversed and for setting said switch to said second position after said first helical channel has been traversed, the cycle of operation of said transducer moving means corresponding to an integral number of rotations of said drum.

References Cited by the Examiner

UNITED STATES PATENTS

| | | | |
|---|---|---|---|
| 1,337,197 | 4/20 | Clausen | 340—174.1 X |
| 2,229,293 | 1/41 | Huntley et al. | 340—174.1 X |
| 2,683,038 | 7/54 | Saliba et al. | 274—20 |
| 2,852,761 | 9/58 | Hagopian | 340—174.1 |
| 2,871,464 | 1/59 | Wright et al. | 340—174.1 |
| 2,920,147 | 1/60 | Sellers | 179—100.2 |

IRVING L. SRAGOW, *Primary Examiner.*

JOHN F. BURNS, EVERETT R. REYNOLDS, *Examiners.*